US009335883B2

(12) United States Patent
Berntson et al.

(10) Patent No.: US 9,335,883 B2
(45) Date of Patent: May 10, 2016

(54) PRESENTING SEARCH RESULT ITEMS HAVING VARIED PROMINENCE

(75) Inventors: Alec John Berntson, Bellevue, WA (US); Sanaz Ahari, Bellevue, WA (US); Kieran Richard McDonald, Seattle, WA (US); Muhammad Arif Iqbal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 992 days.

(21) Appl. No.: 13/228,104

(22) Filed: Sep. 8, 2011

(65) Prior Publication Data

US 2013/0067364 A1  Mar. 14, 2013

(51) Int. Cl.
*G06F 3/048* (2013.01)
*G06F 17/30* (2006.01)

(52) U.S. Cl.
CPC .......... *G06F 3/048* (2013.01); *G06F 17/30864* (2013.01)

(58) Field of Classification Search
CPC ... G06F 3/0481; G06F 9/4443; G06F 3/0482; G06F 3/04847; G06F 17/30864; G06F 17/30867; G06F 17/30675; G06F 17/30696; G06F 17/30265; G06Q 10/10; G06Q 30/02; G06Q 10/087
USPC .......................................................... 715/764
See application file for complete search history.

(56) References Cited

U.S. PATENT DOCUMENTS

| | | | | |
|---|---|---|---|---|
| 4,814,993 | A * | 3/1989 | Zapryanov | G05D 1/0005 244/181 |
| 5,886,698 | A * | 3/1999 | Sciammarella et al. | 715/769 |
| 6,119,114 | A * | 9/2000 | Smadja | |
| 6,385,602 | B1 * | 5/2002 | Tso et al. | |
| 6,473,752 | B1 * | 10/2002 | Fleming, III | 707/708 |
| 7,281,002 | B2 * | 10/2007 | Farrell | |
| 7,685,019 | B2 * | 3/2010 | Collins | 705/14.42 |
| 7,756,754 | B2 * | 7/2010 | Ha | 705/26.62 |
| 7,778,872 | B2 * | 8/2010 | Kamangar et al. | 705/14.52 |
| 7,792,698 | B1 * | 9/2010 | Veach et al. | 705/14.71 |
| 7,822,742 | B2 * | 10/2010 | Majumder et al. | 707/722 |
| 7,836,391 | B2 * | 11/2010 | Tong | 715/234 |
| 7,890,528 | B1 * | 2/2011 | Khoshnevisan | 707/769 |

(Continued)

OTHER PUBLICATIONS

Bailey, et al., "Evaluating Search Systems Using Result Page Context," in Proceeding of the Third Symposium on Information Interaction in Context, Aug. 18-21, 2010, New Brunswick, NJ, 10 pp.

(Continued)

*Primary Examiner* — Jung-Mu Chuang
(74) *Attorney, Agent, or Firm* — Dave Ream; Jim Ross; Micky Minhas (57) ABSTRACT

Computer-readable media, computer systems, and computing devices for facilitating presentation of search result items having varying prominence is provided. The method includes referencing a search result item to be presented within a search results page in response to a search query. Thereafter, a determination is made that a size prominence of the search result item is to be modified. Such a determination can be based on a result attribute(s) associated with the search result item and a result attribute(s) associated with other search result items within the search results page. The size of the search result item is adjusted in accordance with the determination that the size prominence of the search result item is to be modified.

21 Claims, 7 Drawing Sheets

(56) References Cited

U.S. PATENT DOCUMENTS

| | | | |
|---|---|---|---|
| 7,925,651 B2 | 4/2011 | Burges et al. | |
| 7,941,429 B2* | 5/2011 | Krovitz et al. | 707/723 |
| 8,001,103 B2* | 8/2011 | Roy | G06F 17/30864 707/706 |
| 8,032,535 B2* | 10/2011 | Strehl et al. | 707/748 |
| 8,065,199 B2* | 11/2011 | Dumon et al. | 705/26.7 |
| 8,145,623 B1* | 3/2012 | Mehta et al. | 707/713 |
| 8,229,912 B2* | 7/2012 | Downum et al. | 707/706 |
| 8,266,173 B1* | 9/2012 | Reztlaff et al. | 707/780 |
| 8,316,037 B1* | 11/2012 | Garg | G06F 17/30864 707/758 |
| 8,352,508 B2* | 1/2013 | Ravindra et al. | 707/802 |
| 8,370,337 B2* | 2/2013 | Kanungo et al. | 707/723 |
| 8,429,750 B2* | 4/2013 | Bennett | 726/25 |
| 8,521,598 B1* | 8/2013 | Samdadiya et al. | 705/14.73 |
| 8,527,874 B2* | 9/2013 | Friedman | 715/703 |
| 8,548,981 B1* | 10/2013 | Bhattacharjee | G06F 17/3064 707/706 |
| 8,582,872 B1* | 11/2013 | Ioffe et al. | 382/159 |
| 8,630,920 B2* | 1/2014 | Dumon et al. | 705/26.7 |
| 8,694,526 B2* | 4/2014 | Costello et al. | 707/765 |
| 8,694,534 B2* | 4/2014 | Mohajer | 707/769 |
| 8,732,177 B1* | 5/2014 | Chinnasamy et al. | 707/749 |
| 8,738,436 B2* | 5/2014 | Tuladhar et al. | 705/14.4 |
| 8,751,320 B1* | 6/2014 | Kemist | 705/26.1 |
| 8,898,130 B1* | 11/2014 | Sims et al. | 707/706 |
| 8,903,816 B2* | 12/2014 | Dumon et al. | 707/728 |
| 8,909,619 B1* | 12/2014 | Riley | G06F 9/4443 707/722 |
| 8,909,655 B1* | 12/2014 | McDonnell | 707/751 |
| 8,924,406 B2* | 12/2014 | Lunt et al. | 707/758 |
| 8,938,463 B1* | 1/2015 | Kim et al. | 707/751 |
| 9,152,678 B1* | 10/2015 | McDonnell | G06F 17/30241 |
| 9,177,060 B1* | 11/2015 | Bennett | G06F 17/30864 |
| 2002/0111934 A1* | 8/2002 | Narayan | 707/1 |
| 2003/0046161 A1* | 3/2003 | Kamangar et al. | 705/14 |
| 2003/0065643 A1* | 4/2003 | Musgrove et al. | 707/1 |
| 2003/0164827 A1* | 9/2003 | Gottesman et al. | 345/419 |
| 2004/0143600 A1* | 7/2004 | Musgrove et al. | 707/104.1 |
| 2004/0255237 A1* | 12/2004 | Tong | 715/501.1 |
| 2005/0004889 A1* | 1/2005 | Bailey et al. | 707/1 |
| 2005/0060287 A1* | 3/2005 | Hellman et al. | 707/2 |
| 2005/0086105 A1* | 4/2005 | McFadden et al. | 705/14 |
| 2006/0047649 A1* | 3/2006 | Liang | 707/4 |
| 2006/0106793 A1* | 5/2006 | Liang | 707/5 |
| 2007/0027751 A1* | 2/2007 | Carson et al. | 705/14 |
| 2007/0156654 A1* | 7/2007 | Ravinarayanan | 707/3 |
| 2007/0288514 A1* | 12/2007 | Reitter et al. | 707/104.1 |
| 2008/0183558 A1* | 7/2008 | Koran | 705/10 |
| 2008/0183664 A1* | 7/2008 | Cancel et al. | 707/2 |
| 2008/0270364 A1* | 10/2008 | Bayardo | G06F 17/30864 |
| 2008/0275753 A1* | 11/2008 | Protheroe et al. | 705/8 |
| 2009/0019031 A1* | 1/2009 | Krovitz et al. | 707/5 |
| 2009/0037410 A1* | 2/2009 | Jones | G06F 17/30864 |
| 2009/0171943 A1* | 7/2009 | Majumder et al. | 707/5 |
| 2009/0216760 A1* | 8/2009 | Bennett | 707/5 |
| 2009/0228817 A1* | 9/2009 | Adams et al. | 715/767 |
| 2009/0240672 A1* | 9/2009 | Costello | 707/4 |
| 2009/0240685 A1* | 9/2009 | Costello et al. | 707/5 |
| 2009/0241018 A1* | 9/2009 | Costello et al. | 715/227 |
| 2009/0241044 A1* | 9/2009 | Costello | 715/764 |
| 2009/0241058 A1* | 9/2009 | Costello et al. | 715/784 |
| 2009/0241065 A1* | 9/2009 | Costello | 715/843 |
| 2009/0313246 A1* | 12/2009 | Saito | 707/5 |
| 2010/0082618 A1* | 4/2010 | Ott et al. | 707/730 |
| 2010/0094878 A1* | 4/2010 | Soroca et al. | 707/748 |
| 2010/0138452 A1* | 6/2010 | Henkin et al. | 707/803 |
| 2010/0262495 A1* | 10/2010 | Dumon et al. | 705/14.54 |
| 2010/0262601 A1* | 10/2010 | Dumon et al. | 707/727 |
| 2010/0262602 A1* | 10/2010 | Dumon et al. | 707/728 |
| 2010/0262616 A1* | 10/2010 | Eskolin et al. | 707/769 |
| 2010/0268596 A1* | 10/2010 | Wissner et al. | 705/14.49 |
| 2010/0306161 A1* | 12/2010 | Chen et al. | 706/52 |
| 2010/0325107 A1* | 12/2010 | Kenton et al. | 707/723 |
| 2011/0029518 A1* | 2/2011 | Tong | 707/736 |
| 2011/0035458 A1* | 2/2011 | Burnim | 709/206 |
| 2011/0078022 A1* | 3/2011 | Desikan et al. | 705/14.54 |
| 2011/0082850 A1* | 4/2011 | Ball | G06F 17/30867 707/706 |
| 2011/0258033 A1* | 10/2011 | Gollapudi et al. | 705/14.42 |
| 2011/0258049 A1* | 10/2011 | Ramer et al. | 705/14.66 |
| 2011/0276560 A1* | 11/2011 | Costello | 707/708 |
| 2011/0295716 A1* | 12/2011 | Dumon et al. | 705/26.61 |
| 2012/0078825 A1* | 3/2012 | Kulkarni et al. | 706/12 |
| 2012/0209831 A1* | 8/2012 | Rehman | 707/723 |
| 2012/0290570 A1* | 11/2012 | Ravindra et al. | 707/728 |
| 2012/0306894 A1* | 12/2012 | Gottschlich et al. | 345/501 |
| 2012/0317109 A1* | 12/2012 | Richter et al. | 707/734 |
| 2013/0006971 A1* | 1/2013 | Dasher et al. | 707/722 |
| 2013/0275212 A1* | 10/2013 | Agarwal | 705/14.52 |
| 2014/0074612 A1* | 3/2014 | Mahadevan et al. | 705/14.58 |
| 2014/0214461 A1* | 7/2014 | Diliberto et al. | 705/5 |

OTHER PUBLICATIONS

Song, et al., "Learning Block Importance Models for Web Pages," in Proceedings of the 13th International Conference on World Wide Web, May 17-22, 2004, New York, NY, 9 pp.

Ponnuswami, et al., "On Composition of a Federated Web Search Result Page: Using Online Users to Provide Pairwise Preference for Heterogeneous Verticals," in Proceedings of the Fourth ACM International Conference on Web Search and Data Mining, Feb. 9-12, 2011, Hong Kong, China, 10 pp.

Gomes, et al., "Externalities in Keyword Auctions: An Empirical and Theoretical Assessment," in Proceedings of the 5th International Workshop on Internet and Network Economics, Dec. 14-18, 2009, Amsterdam, 10 pp.

Clarkson, et al., "ResultMaps: Visualization for Search Interfaces," in Journal of IEEE Transactions on Visualization and Computer Graphics, vol. 15, Issue 6, Nov.-Dec. 2009, 8 pp.

Dreller, "Search Stats You Need to Know & the Bible of the Search Industry," Sep. 26, 2008, Retrieved on: Jul. 6, 2011, Available at: http://searchengineland.com/search-stats-you-need-to-know-the-bible-of-the-search-industry-14825.

* cited by examiner

PRESENTING SEARCH RESULT ITEMS HAVING VARIED PROMINENCE

BACKGROUND

A search engine results page (SERP) generally provides various search result items in response to a user query, such as web results, instant answers, related searches, advertisements, etc. Oftentimes, search result items are displayed based on relevance to the user query, or intent thereof, in an effort to optimize a user experience. Generally, the space allocated for the various search results items within a search engine results page is static in that the search result items are displayed in accordance with a particular size or space. Such a static space allocation offers little else in terms of encouraging user engagement with more relevant search result items.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

According to embodiments of the invention, a search results page generally includes search result items (e.g., search results, instant answers, etc) that can appear in varying extents of prominence (e.g., vertical height, horizontal width, etc.). A prominence size of a particular search result item can be selected, for example, based on user engagement with the particular search result item compared to user engagement with other search result item(s) to be presented within the search results page. In this regard, a prominence size of a search result item having a greater user engagement than other search result item(s) may be increased within the search result page so that a user may be able to more readily identify or select information that is more likely pertinent to or desired by the user.

BRIEF DESCRIPTION OF THE DRAWINGS

Embodiments of the invention are described in detail below with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention described herein include computer-readable media having computer-executable instructions for performing a method of facilitating presentation of search result items having varied prominence. The method includes referencing a search result item to be presented within a search results page in response to a search query. A determination is made that a size prominence of the search result item is to be modified based on at least one result attribute associated with the search result item and at least one result attribute associated with other search result items within the search results page. The size of the search result item is adjusted in accordance with the determination that the size prominence of the search result item is to be modified.

In a second illustrative embodiment, a graphical user interface embodied on one or more computer-readable media and executable on a computer is provided. The graphical user interface includes a first display area configured for displaying a first search result item and a second search result item presented on a search results page. The first search result item and the second search result item comprise an instant answer or a web result. The first search result item is displayed having a greater size allocation than the second search result item based on one or more result attributes associated with the first search result that indicate a strong user engagement relative to one or more result attributes associated with at least the second search result item presented on the search results page.

In a third illustrative embodiment, computer-executable instructions cause a computing device to perform a method of facilitating presentation of search result items having varied prominence. The method includes referencing a set of search result items for display within a search results page that are relevant to a search query. The set includes web results and instant answers. The search result items are ranked based on relevance to the search query. A determination is made that a first search result item is to be increased from a first size allocation to a second size allocation that is different from the first size allocation. Such a determination is based on a result attribute(s) associated with the search result items indicating that predicted user engagement with the first search result item is greater than predicted user engagement with at least the second search result item. A determination is also made that a second search result item is to maintain the first size allocation. The first search result item having the second size allocation and the second search result item having the first size allocation are presented within the search results page in accordance with the corresponding ranking.

Various aspects of embodiments of the invention may be described in the general context of computer program products that include computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplate media readable by a database, a processor, and various other networked computing devices. By way of example, and not limitation, computer-readable media include media implemented in any method or technology for storing information. Examples of stored information include computer-executable instructions, data structures, program modules, and other data representations. Media examples include, but are not limited to RAM, ROM, EEPROM, flash memory and other memory technology, CD-ROM, digital versatile discs (DVD), holographic media and other optical disc storage, magnetic cassettes, magnetic tape, magnetic disk storage, and other magnetic storage devices. These technologies can store data momentarily, temporarily, or permanently.

Figure 1:
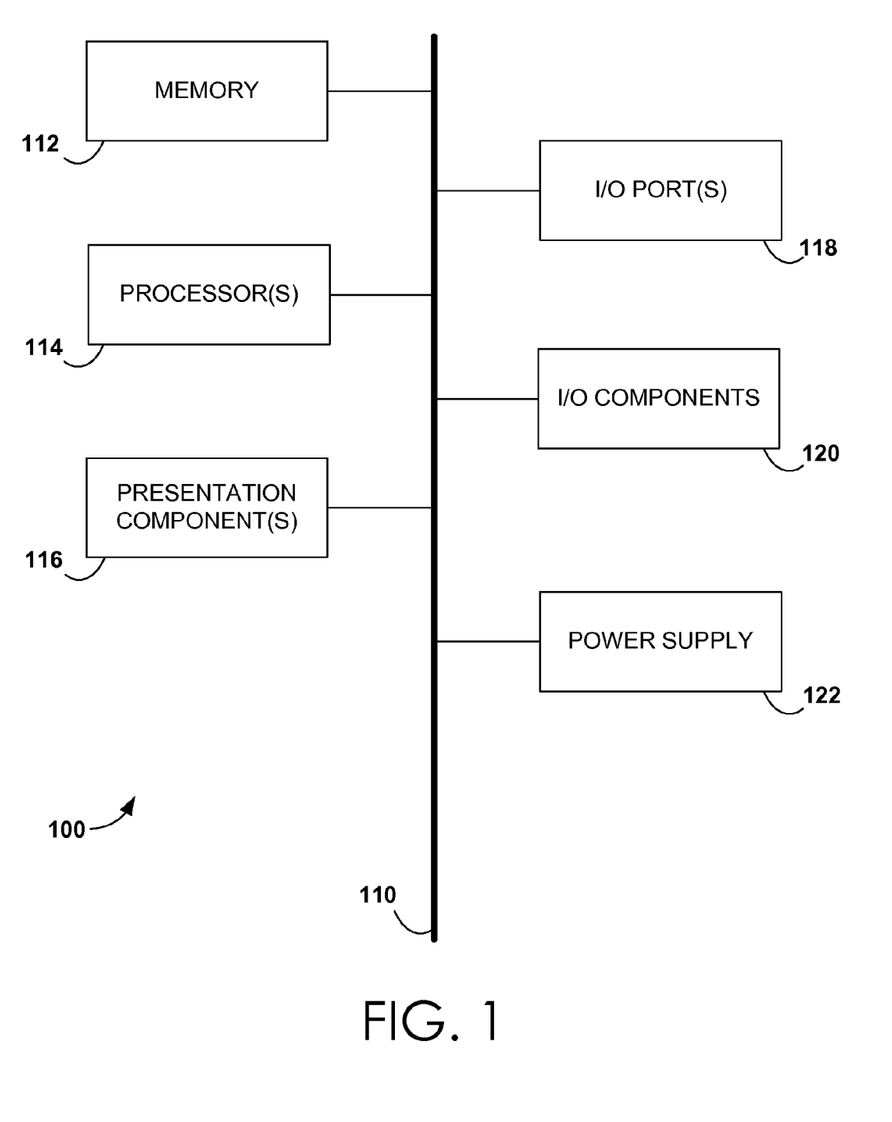
FIG. 1 is a block diagram of an exemplary computing device suitable for implementing embodiments of the invention.

An exemplary operating environment in which various aspects of the present invention may be implemented is described below in order to provide a general context for various aspects of the present invention. Referring initially to FIG. 1, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The computing device 100 includes a bus 110 that directly or indirectly couples the following devices: a memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," "tablet," etc., as all are contemplated within the scope of FIG. 1 and reference to "computing device."

The memory 112 includes computer-executable instructions (not shown) stored in volatile and/or nonvolatile memory. The memory may be removable, nonremovable, or a combination thereof. Exemplary hardware devices include solid-state memory, hard drives, optical-disc drives, etc. The computing device 100 includes one or more processors 114 coupled with a system bus 110 that read data from various entities such as the memory 112 or I/O components 120. In an embodiment, the one or more processors 114 execute the computer-executable instructions to perform various tasks and methods defined by the computer-executable instructions. The presentation component(s) 116 are coupled to the system bus 110 and present data indications to a user or other device. Exemplary presentation components 116 include a display device, speaker, printing component, and the like.

The I/O ports 118 allow computing device 100 to be logically coupled to other devices including the I/O components 120, some of which may be built in. Illustrative components include a microphone, joystick, game pad, satellite dish, scanner, printer, wireless device, keyboard, pen, voice input device, touch-input device, touch-screen device, interactive display device, or a mouse. The I/O components 120 can also include communication connections that can facilitate communicatively connecting the computing device 100 to remote devices such as, for example, other computing devices, servers, routers, and the like.

Embodiments of the present invention are directed to facilitating presentation of search result items having varied prominence within a search results page. Prominence, as used herein, refers to a size or space allocation of a search result item. In this regard, prominence of a search result item may refer to a vertical height or space (e.g., a pixel height), a horizontal width or space (e.g., a pixel width), a number of lines, a character count, a number of components, a combination thereof, or the like. Accordingly, embodiments of the present invention facilitate identifying a space allocation for one or more search result items and displaying such search result items in accordance with the identified space allocation. Displaying search result items with varying degrees or extents of prominence assists in engaging a user in a search result item(s) the user may deem of interest or more relevant. As such, a user may be able to more readily identify or select information that is pertinent to or desired by the user. For instance, a search result item displayed in a greater or more prominent size relative to other search result items is more likely to be recognized by a user.

As used herein, a search result item refers to a component(s) on a search results page (i.e., SERP) that is displayed in response to a user search query. By way of example only, a component can be, for instance, a web result, an instant answer, a related search result, an advertisement, a tab item, or the like. In this regard, in one embodiment, a search result item can be, for example, a web result, an instant answer, a related search result, an advertisement, a tab item, or the like. Additionally or alternatively, a search result item can be a set of components displayed as a group adjacent to one another on a search results page. That is, a search result item can be a group of images that are positioned adjacent to one another such that the group appears as one search result item. For example, with reference to FIG. 3, search result item 306 is a group of images positioned side-by-side including image component 320, image component 322, image component 324, image component 326, and image component 328. In such a case, when making a determination of prominence size of the search result item 306, the resulting size might be a number of five images such that five images appear within the image search result item 306.

The term "query" refers to any type of request containing one or more search terms that can be submitted to a search engine (or multiple search engines) for identifying search result items, and/or components thereof, based on the search term(s) contained in the query. The search result items or components thereof that are identified by the queries in the data structure are representations of results produced in response to the queries. For example, the search result items can be web results, instant answers, advertisements, related searches, etc.

A web result refers to a result that is presented as relevant to a user search query. Typically, a web result includes a website link and a snippet that summarizes content of the website. A user may select a website link of a web result to navigate to the webpage related to the user search query. For example, assume a user search query is "weather in Seattle." An algorithm result within a search results page might include a URL to weather.com. In such a case, the user can select the URL, transfer to that webpage, and, thereafter, input Seattle to obtain the weather in Seattle.

An "instant answer" (referred to herein, interchangeably, as an "answer") refers to a result that is a response or answer to a search query that is provided to a user on the main search results page. That is, a user is presented with domain-specific content on the search results page in response to a query, whereas the user might otherwise be required to select a link within the search results page to navigate to another webpage and, thereafter, search further for the desired information. For example, assume a user search query is "weather in Seattle." An "answer" presented on the search results page contains the weather for Seattle such that a user is not required to navigate to another webpage to find the answer to the intended query. As can be appreciated, an answer might pertain to any subject matter including, for example, weather, news, area codes, conversions, dictionary terms, encyclopedia entries, finance, flights, health, holidays, dates, hotels, local listings, math, movies, music, shopping, sports, package tracking, and the like. An answer can be in the form of an icon, a button, a link, text, a video, an image, a photograph, an audio (e.g., a music clip), a combination thereof, or the like.

A related search result refers to an item that identifies a search or query that is related to the currently input query and/or corresponding search results. An advertisement refers to a notice or announcement promoting a product, service, event, need, etc. A tab item refers to a tab or identifier that, when selected, provides a view of related search result items or a category of search result items. For example, assume that a user selects an "image" tab. In such a case, a group of images are presented within a search results page. Tab items can be, for example, web, images, news, music, video, shopping, etc.

As can be appreciated, various search result items and/or components can be displayed within different regions of a search results page. For example, web results and instant answers can be displayed within a search content region of a search results page. A search content region refers to a region of the search results page that displays search results having content related to the query. Generally, a search content region is a main or primary portion of the search results page and, typically, is presented within the center of the search results page. In a search content region, in some embodiments, various web results and instant answers are integrated with one another based on relevance to the query and/or query intent. Similarly, advertisements can be displayed in an advertisement region, related search queries can be displayed in a related queries region, and tab items can be displayed in a tab region.

Figure 3:
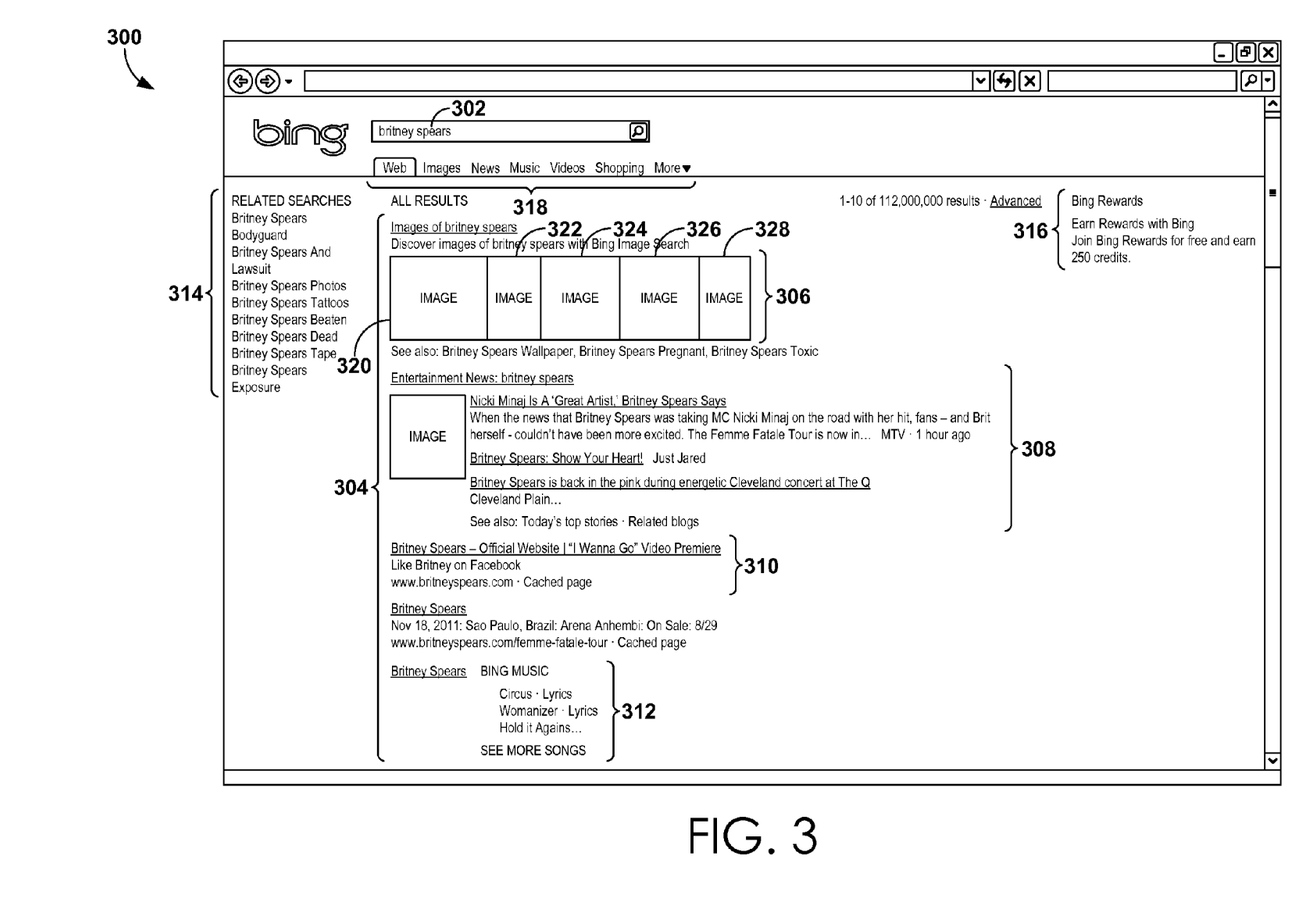
FIG. 3 provides an exemplary illustration of a plurality of search result items having varied prominence, in accordance with embodiments of the invention.

By way of example and with reference to FIG. 3, FIG. 3 illustrates an exemplary search results page 300 presented in response to a user search query 302. As illustrated in FIG. 3, a set of search result items 304 is displayed in response to the user search query 302 within a search content region of the search results page. Such search result items 304 include an image search result item 306 (e.g., a set of image instant answers), a news search result item 308 (e.g., a set of news instant answers), a web search result item 310 (e.g., a web result), a music search result item 312 (e.g., a set of music instant answers), etc. The search results page 300 includes other sets of search result items, such as a set of related search results 314, a set of advertisements 316, and a set of tab items 318.

Figure 2:
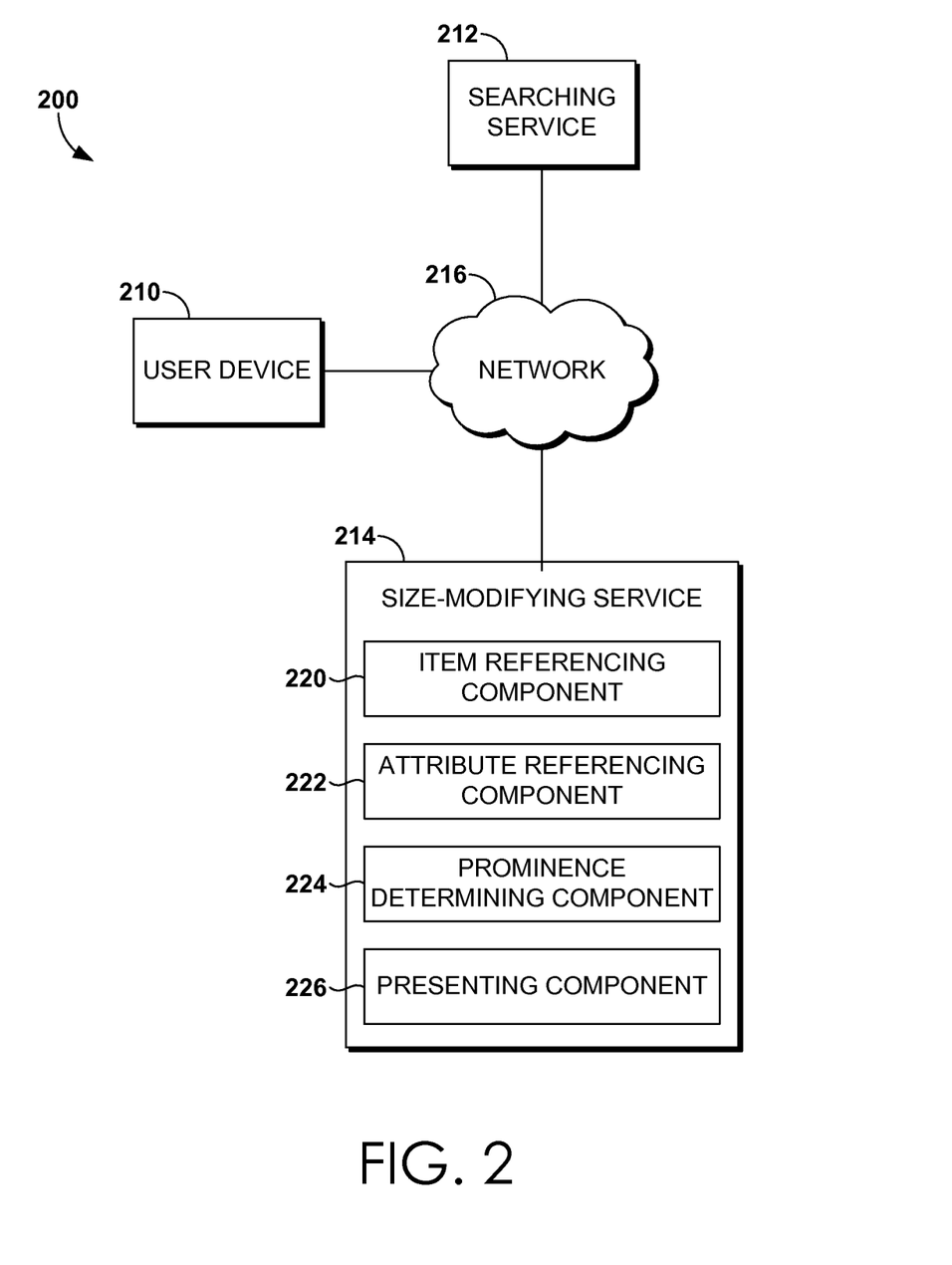
FIG. 2 is a block diagram of an exemplary network environment suitable for use in implementing embodiments of the invention.

Turning now to FIG. 2, a block diagram of an exemplary network environment 200 suitable for use in implementing embodiments of the invention is shown. The network environment 200 includes a user device 210, a searching service 212, and a size-modifying service 214. The user device 210, the searching service 212, and the size-modifying service 214 communicate through a network 216, which may include any number of networks such as, for example, a local area network (LAN), a wide area network (WAN), the Internet, a cellular network, a peer-to-peer (P2P) network, a mobile network, or a combination of networks. The network environment 200 shown in FIG. 2 is an example of one suitable network environment and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, the user device 210 may be in communication with the searching service 212 via a mobile network or the Internet, and the searching service 212 may be in communication with size-modifying service 214 via a local area network. Further, although the environment 200 is illustrated with a network, one or more of the components may directly communicate with one another, for example, via HDMI (high-definition multimedia interface), DVI (digital visual interface), etc.

The user device 210 can be any kind of computing device capable of allowing a user to submit a search query to the searching service 212 and/or the size-modifying service 214 and to receive, in response to the search query, a search results page including at least one search result item having a modified, altered, or varied prominence (size). For example, in an embodiment, the user device 210 can be a computing device such as computing device 100, as described above with reference to FIG. 1. In embodiments, the user device 210 can be a personal computer (PC), a laptop computer, a workstation, a tablet, a mobile computing device, a PDA, a cell phone, or the like.

In an embodiment, the user device 210 is separate and distinct from the searching service 212 and/or the size-modifying service 214 illustrated in FIG. 2. In another embodiment, the user device 210 is integrated with the searching service 212 and/or size-modifying service 214. For clarity of explanation, we will describe embodiments in which the user device 210, the searching service 212, and the size-modifying service 214 are separate, while understanding that this may not be the case in various configurations contemplated within the present invention.

With continued reference to FIG. 2, the user device 210 communicates with the searching service 212 to facilitate a search for content. In embodiments, for example, a user utilizes the user device 210 to search for content available via the network 216. For instance, in some embodiments, the network 216 might be the Internet, and the user device 210 interacts with the searching service 212 to search for content stored on servers associated with websites. In other embodiments, for example, the network 216 might be an enterprise network associated with a company. In these embodiments, the user device 210 interacts with the searching service 212 to search for content stored on various nodes within the enterprise network. It should be apparent to those having skill in the relevant arts that any number of other implementation scenarios may be possible as well.

The searching service 212 provides searching services to users. In embodiments, the searching service 212 provides searching services by searching for content in an environment in which content can be stored such as, for example, the Internet, a local area network (LAN), a wide area network (WAN), a database, a computer, or the like. The searching service 212, according to embodiments, can be implemented as server systems, program modules, virtual machines, components of a server or servers, networks, and the like.

In embodiments, the searching service 212 receives search queries, i.e., search requests, submitted by a user via the user device 210. Search queries received from a user can include search queries that were manually or verbally input by the user, queries that were suggested to the user and selected by the user, and any other search queries received by the searching service 212 that were somehow approved by the user. In other embodiments, the searching service 212 can receive search queries originating at other locations. For instance, query suggestion modules (not shown) associated with the searching service 212 can provide search queries in response to user selection of query suggestions, and the like. Generally, the searching service 212 can receive search queries from any number of people, locations, organizations, and devices.

The searching service 212 may include or be at least a portion of, for example, a search engine, a crawler, or the like. The searching service 212, in some embodiments, is configured to perform a search using a query submitted through the user device 210, or other device. In various embodiments, the searching service 212 can provide a user interface for facilitating a search experience for a user communicating with the user device 210.

In an embodiment, the searching service 212 is configured to receive a submitted query and to use the query to perform a search. In an embodiment, upon identifying search result items, or components thereof, that satisfy the search query, the searching service 212 returns a set of search result items, or components thereof, to the user device 210 by way of a graphical interface such as a search results page. A set of search result items includes representations of content or content sites (e.g., web-pages, databases, or the like that contain content) that are deemed to be relevant to the user-defined search query. Search result items can be presented, for example, as content links, snippets, thumbnails, summaries, answers, advertisements, or the like. Content links refer to selectable representations of content or content sites that correspond to an address for the associated content. For example, a content link can be a selectable representation corresponding to a uniform resource locator (URL), IP address, or other type of address. That way, selection of a content link can result in redirection of the user's browser to the corresponding address, whereby the user can access the associated content. One commonly used example of a content link is a "hyperlink" (referred to herein, interchangeably, as an "anchor").

According to embodiments of the invention, a search results page can include a number of different types of content. For example, the search results page can include web results (i.e., algorithmic search results), instant answers, related searches, historical information, sponsored search results, and advertisements. According to embodiments of the invention, the searching service 212 can generate or identify such items. Alternatively or additionally, the searching service 212 can communicate with another service(s) to obtain such search result items, or components thereof. For instance, instant answers might be retrieved or received from an answer service (not shown), to provide an answer(s) on a search results page, and/or advertisements might be retrieved or received from an advertisement service (not shown) to provide an advertisement(s) on a search results page.

In an embodiment, the searching service 212 monitors searching activity, and can produce one or more records or logs representing search activity, previous queries submitted, search result items obtained, and the like. These services can be leveraged to improve the searching experience in many different ways. According to various embodiments of the invention, the searching service 212 references an associated web index (not illustrated for brevity and clarity of description) to identify search result items, or components thereof, that are relevant to a search query received from a user.

In this regard, the searching service 212, or associated service, can be configured to monitor, gather, identify, and/or store (e.g., via a database) result attributes associated with the search result items, or components thereof. Result attributes refer to historical data or information pertaining to a query or resulting search result item, or component thereof. In this regard, a result attribute describes or characterizes a query, a search result item, and/or user engagement or interaction therewith. User engagement refers to a user(s) interaction (e.g., selection or click) with a search result item. A result attribute may be, for example, a number of times a search result item has been presented (e.g., within a particular time frame), a placement or position of a search result item, a number of times a search result item is selected or clicked (e.g., within a particular time period), a click-through rate, a number of times a search result item is selected at a particular position or size within a search result page (e.g., within a particular time frame), a previous size of a search result item, a designation or classification as to query intent (i.e., whether a query includes a particular intent, such as, video intent, image intent, commerce intent, etc.), and/or the like.

Result attributes can be populated into a database, such as a result database, for example, via a database generator. A database generator is configured to generate, update, or modify a result database. A result database refers to any database, or other storage system, that includes result attributes. The result attributes can be input into the database. In embodiments, the queries and/or search result components are entered into the result database in association with result attributes related to corresponding search result items, or components thereof. As can be appreciated, result attributes can be updated or modified as historical data is gathered. Accordingly, as more data is monitored and analyzed, more recent data can be used to generate new or modified result attributes. In this regard, more recent data can be aggregated with the previous historical data to generate updated result attributes or, alternatively, the more recent data can be used to generate updated result attributes while more historical or outdated data is removed from the analysis.

In some embodiments, searching service 212 ranks the search result items, or components thereof, relevant to the search query. In this regard, an order, position, or placement is identified for search result items and/or components thereof. Search result items most relevant to a particular entity are generally provided with a higher ranking. A higher rank is used to refer to a rank that is stronger or otherwise indicates a higher priority or preference. As can be appreciated, in this way, in some cases a higher rank may actually correspond to a lower value if a lower value indicates a higher priority or preference.

Rankings can be based on any data such as, for example, click-through rates in query logs, history of user(s) (e.g., search history, navigation history, query logs), query intent, a combination thereof, or the like. In embodiments, rankings are based on result attributes. As such, result attributes can be analyzed to determine where search result items, or components thereof, should be placed within a search results page. By way of example only and with reference to FIG. 3, image search result item 306 (e.g., a set of image instant answers) is positioned highest on the search results page within the set of search result items 304, followed by news search result item 308 (e.g., a news instant answer), a web search result item 310 (e.g., a web result), and a music search result item 312 (e.g., a set of music instant answers). Similarly, the search result items within the set of related searches 314, set of advertisements 316, and set of tab items 318 can also be presented in order of relevance (e.g., relevance to user query or query intent).

As can be appreciated, the searching service 212 may communicate with the size-modifying service 214 to integrate varying extents of prominence to search result items within a search results page. In this regard, the size-modifying 214 may communicate data to the searching service 212 for implementation of prominence of search result items into a search results page. Alternatively, searching service 212 may communicate a search results page, or search result items or components, to size-modifying service 214 for incorporation of search result item prominence into the search results page.

Although size-modifying service 214 is illustrated in FIG. 2 as a separate component, it can be appreciated that the size-modifying service 214 may be combined with the searching service 212 or may comprise any number of components. For example, the searching service 212 and the size-modifying service 214 may function as part of a search engine.

The size-modifying service 214 generally provides a prominence for search result items (e.g., search result items identified by the search service 212). As previously mentioned, a prominence identifies a size allocation at which a search result item is to be displayed within a search results page. The size-modifying service 214, in some embodiments, includes an item referencing component 220, an attribute referencing component 222, a prominence determining component 224, and a presenting component 226. According to embodiments of the invention, the size-modifying service 214 can include any number of other components not illustrated. In some embodiments, one or more of the illustrated components 220, 222, 224, and 226 can be integrated into a single component or can be divided into a number of different components. Components 220, 222, 224, and 226 can be implemented on any number of machines and can be integrated, as desired, with any number of other functionalities or services.

The item referencing component 220 is configured to reference search result items or components, or an identification thereof, relevant or related to a search query. In this regard, the item referencing component 220 determines, receives, retrieves, accesses, or otherwise obtains one or more search result items/components or an identification thereof. In some embodiments, rankings associated with search result items/components may also be referenced. In accordance with one embodiment, rankings of search result items are determined prior to determining prominence for the search result items. As discussed above in relation to the searching service 212, search result items regarded as relevant to the search query are ranked or positioned within a search results page. That is, a rank, order, or position is determined for various search result items and/or components such that they are displayed as such in a search results page presented to a user. Such rankings or search page layout and corresponding search result items/components can be referenced, that is, identified, determined, accessed, received, retrieved, etc. such that prominence for a search result item(s) can be determined. As can be appreciated, the item referencing component 220 can reference indications of search result items/components and/or rankings associated therewith. In other cases, the actual search result items or components and/or corresponding rankings may be referenced.

The attribute referencing component 222 is configured to reference result attributes associated with search result items and/or components. Result attributes can be referenced by receiving, obtaining, accessing, retrieving, determining, identifying, or the like. In embodiments, result attributes may be provided by a searching service, such as searching service 212, a size-modifying service, such as size-modifying service 214, a combination thereof, or the like.

The prominence determining component 224 is configured to determine prominence for search result items to be displayed on a search results page. As can be appreciated, prominence can be determined for any number of search result items on a search results page. For example, prominence might be determined for each search result item within a search results page. In other cases, prominence might be determined for a select group of search result items, such as a particular type of search result item (e.g., an instant answer, a web result, an advertisement, a related search, etc.), a particular number of search result items (e.g., the first five search result items to be displayed on a search result page), a particular region of search results (e.g., a region initially displayed on the screen to a user prior to scrolling or navigating, a search content region, an advertisement region, a related search region, etc.), or the like. In embodiments, prominence is dynamically determined upon a search query being entered, for example, based on aggregated user engagement data or a specific user behavior. In this regard, a search result item associated with a first query that is displayed in a particular prominence size at a first instant can be displayed in a different prominence size in response to a second query similar to or the same as the first query (e.g., updated historical data may result in such a size modification).

In embodiments, the referenced search result items and corresponding result attributes (e.g. result attributes that indicate user engagement with search result items) are used to determine prominence for search result items. In determining prominence for a particular search result item, the prominence determining component 224 may compare a result attribute(s) with result attribute(s) corresponding with other search result items to be presented on the search results page. For example, user engagement associated with a particular search result item may be compared to user engagement associated with other search result items within the search results page (e.g., all other search result items within the search results page, a particular number of other search results items within the search results page, an adjacent search result item(s), a particular type of search result items, one or more other search result items within a particular region, a combination thereof, etc.).

Based on a comparison of result attribute(s) associated with a particular search result item to result attribute(s) associated with one or more other search result items within the search results page, the prominence determining component 224 may determine that an adjustment or modification to the analyzed search result item should be made and/or may determine an extent or amount of prominence adjustment to be made. A determination of whether to adjust or modify prominence of a search result item can be made using any algorithm, model, method, function, etc. (e.g., a machine learned model, algorithm, or cost function).

In some embodiments, a result threshold is utilized to make such a determination. For example, in cases that user engagement of a current search result item exceeds a result threshold, a determination is made that prominence of the search result item should be adjusted (e.g., increased or decreased). In some cases, a result threshold can be a predetermined threshold that indicates a maximum or minimum value that should be exceeded to make a prominence determination. For example, assume a result threshold refers to a 50% user engagement threshold. That is, if a particular search result item incurs user engagement (e.g., a click or user selection) fifty percent or more in the instances the search result item is displayed for a particular query, such a search result item is deemed a significant result and prominence of the search result item should be increased.

In other cases, a result threshold can be a predetermined threshold that indicates a maximum or minimum value relative to at least one other search result item that should be exceeded to make a prominence determination. For example, assume a result threshold refers to a 20% click through rate (CTR) relative to the other search result items identified to be presented within a search results page. That is, if a particular search result item has a CTR that is 20% more than the aggregated CTR of the remaining search result items within the search results page, such a search result item is deemed a significant result and prominence of the search result item should be increased. By way of another example, if a particular search result item has a CTR that is 20% more than another search result item(s) presented below (e.g., adjacent), a determination may be made that the search result item prominence be increased.

As can be recognized, in some cases, a particular search result item may be analyzed in light of the other search result items within the search results page. That is, the overall user engagement of search result items within a search results page is analyzed to determine whether to modify prominence of a specific search result item. In other cases, a specific set of search result items within a search results page may be analyzed to determine whether to modify prominence of a particular search result item. In this regard, one or more adjacent search result items, a particular type of search result items, a particular region of a search results page, a combination thereof, or the like, may be used to analyze whether to modify prominence of a particular search result item.

Prominence size may also be identified or selected upon determining that prominence of a search result item should be modified. Accordingly, the prominence determining component 224 can be configured to determine, identify, or select one or more prominence levels or extents to present search result items. A prominence size can be any size of a search result item. In some cases, the prominence determining component 224 may identify or select a predetermined size. That is, one of a predetermined number of sizes may be selected. By way of example only, small, medium, large, and extra large sizes may be predetermined. For instance, assume that search result items are typically displayed in a medium prominence size. Upon determining that a particular search result item should be increased in size, either the large or extra large size may be selected for displaying the search result item. In other cases, the prominence determining component 224 may select or identify any size. That is, the prominence size of a search result item can be scaled to any size (e.g., using a scaling factor).

In embodiments, to determine a prominence size for a search result item, comparisons of result attribute(s) associated with a particular search result item to result attribute(s) associated with one or more other search result items within the search results page can be utilized. A determination of a size to which to adjust or modify prominence of a search result item can be made using any algorithm, model, method, function, etc. (e.g., a machine learned model, algorithm or cost function). In some embodiments, a result threshold is utilized to make such a determination. For example, in cases that a user engagement of a current search result item exceeds a first result threshold, a determination is made that prominence of the search result item should be adjusted (e.g., increased or decreased) to a first size or by a first scaling factor. Comparatively, in cases that the user engagement of the search result item exceeds a second result threshold, a determination is made that prominence of the search result item should be adjusted to a second size or by a second scaling factor. Alternatively or additionally, a prominence size for a search result item can be scaled in proportion to a comparison of result attributes associated with search result items. For instance, assume that a search result item is determined to have twice as strong user engagement as another search result item(s). In such a case, the prominence size for the specific search result item might be twice (or another scaling factor) as big as the other search result item(s).

As can be appreciated, other features can be used to determine whether to adjust a prominence size and/or to determine a prominence size. For example, ranks associated with search result items, page layout of search result items, type of search result item (e.g., instant answer, video instant answer, music instant answer, news instant answer, web result, etc.), region of search result item (e.g., search content region, advertisement region, etc.), and/or the like can be used to make a prominence and/or prominence size determination. For instance, in determining a prominence size or whether to adjust a prominence size of a search result item, a location or position of the search result item within the search result page may be considered. As another example, a type of the search result may be considered in making such a determination. For instance, an image instant answer might have six prominence sizes available whereas a web result might have three prominence sizes available.

In some embodiments, upon an initial selection of a prominence size for one or more search result items, any search result constraints can be analyzed to verify that such prominence sizes, upon implementation, would be appropriate. A search result constraint refers to any constraint, limit, or restriction to contemplate when making a prominence determination or a prominence size determination. As can be appreciated, when a particular search result item is increased in size, another search result item may be affected. For example, another search result item may be reduced in size, may be moved out of the initial viewing region (e.g., below the fold), may be moved to another search results page that is required to be navigated to, etc. More specifically, assume that an image search result item is to be enlarged as it is deemed extremely relevant to the search query. As such, the tendency might be to make the image(s) as large as possible to portray importance to the user. In such a case, however, a constraint may be that a particular number of other search result items (e.g., web results) are desired to also be displayed in the search results page or even in the initial viewing region of the search results page. A constraint may be any limitation or restriction, such as, for example, a size constraint, a total size for a particular type of search result items (e.g., instant answers or video instant answers), a number of a particular type of search result items on a page or initial viewing screen, a number of search result items on a page or initial viewing screen, or the like.

The presenting component 226 is configured to present search result items. In one embodiment, search result items are presented by displaying such data in association with a search results page to a user via a user interface. In another embodiment, search result items are presented by communicating such data to another computing device. For example, prominence levels may be communicated to a search engine such that the search engine can incorporate the data into the search results page to be transmitted to the user device. By way of further example, such data may be communicated to the user device for display to the user, via a display screen of the user device.

Figure 4:
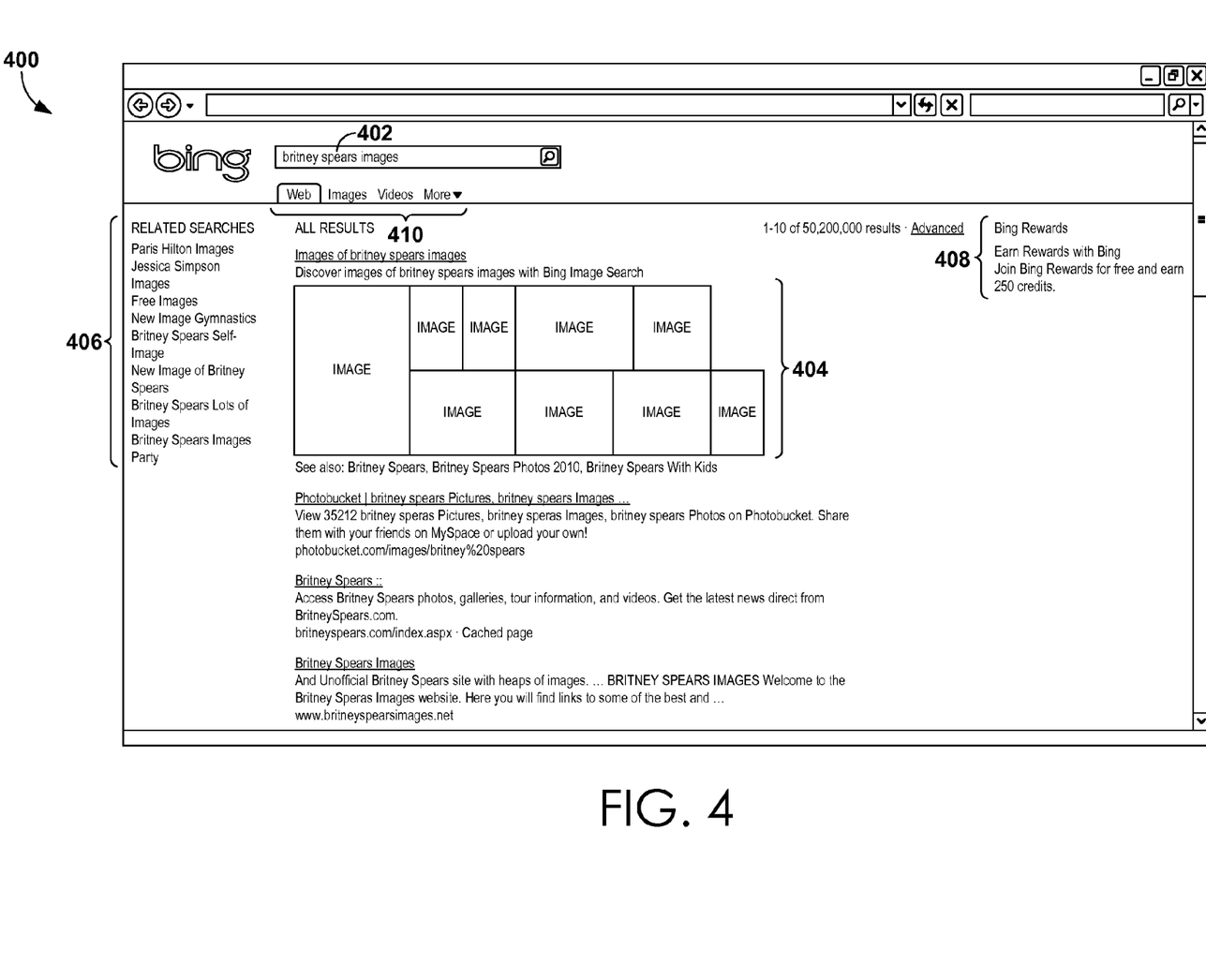
FIG. 4 provides another exemplary illustration of a plurality of search result items having varied prominence, in accordance with embodiments of the invention.

By way of example only, FIGS. 3-4 illustrate displays of a graphical user interface for providing search result items having varying prominence, according to embodiments of the present invention. Such display views can be viewed, for example, via a display screen of a user device, such as user device 210. As can be appreciated, a user may interact with a display screen using well known input components, such as, for example, a mouse, joystick, stylus, touch screen, keyboard, or the like.

As previously mentioned, FIG. 3 illustrates an exemplary search results page 300 presented in response to a user search query 302. As illustrated in FIG. 3, a set of search result items 304 is displayed in response to the user search query 302. Such search result items 304 include an image search result item 306 (e.g., a set of image instant answers), a news search result item 308 (e.g., a set of news instant answers), a web search result item 310 (e.g., a web result), a music search result item 312 (e.g., a set of music instant answers), etc. The search results page 300 includes other sets of search result items, such as a set of related search results 314, a set of advertisements 316, and a set of tab items 318.

As illustrated in FIG. 3, five images were selected to be presented as the image search result item 306 and placed as a top ranked result of web results and instant answers. In this regard, the image search result item 306 includes image instant answers 320, 322, 324, 326, and 328. News search result item 308 was also designed to include multiple components of search results resulting in occupancy of a greater vertical height.

By comparison and with reference to search results page 400 of FIG. 4, assume that a user search query is "britney spears images" 402. Further assume that historical data indicates that users searching for "britney spears images" typically select an image instant answer (e.g., an image is selected 75% of time that search results are presented for query). Accordingly, a determination may be made to increase the prominence of the image search result item 404. In such a case, for instance, the vertical space allocation may be increased for search result item 404 and/or the number of image components included in the search result item 404 may be increased (e.g., increased to eight images). As illustrated in FIG. 4, because image search results were deemed so relevant to the particular query of "britney spears images" compared to other search results on the page, search result item 404 is increased in size to draw attention to content deemed most relevant to the user's interest. Accordingly, while the image search result item 306 of FIG. 3 may have been increased in vertical size based on user engagement relative to user engagement with other search result items on the search results page 300, image search result item 404 of FIG. 4 may have been increased by a more significant amount based on a greater user engagement relative to user engagement with other search result items on the search result page 400.

Although not illustrated, various search result items could also be adjusted in prominence relative to other search result items within a set of search results item (e.g., a specific region such as search content region, advertisement region, etc.), such as the set of related searches 406, the set of advertisements 408, the set of tab results 410, etc. In this regard, with respect to FIGS. 3 and 4, modifications made to size allocation of search results items is based on result attributes (e.g., user engagement) relative to other result attributes corresponding with search result items in the same region (i.e., search content region). It is contemplated, however, that advertisement search result items could be adjusted in prominence relative to other advertisement search result items, related search results could be adjusted in prominence relative to other related search results, etc.

Figure 5:
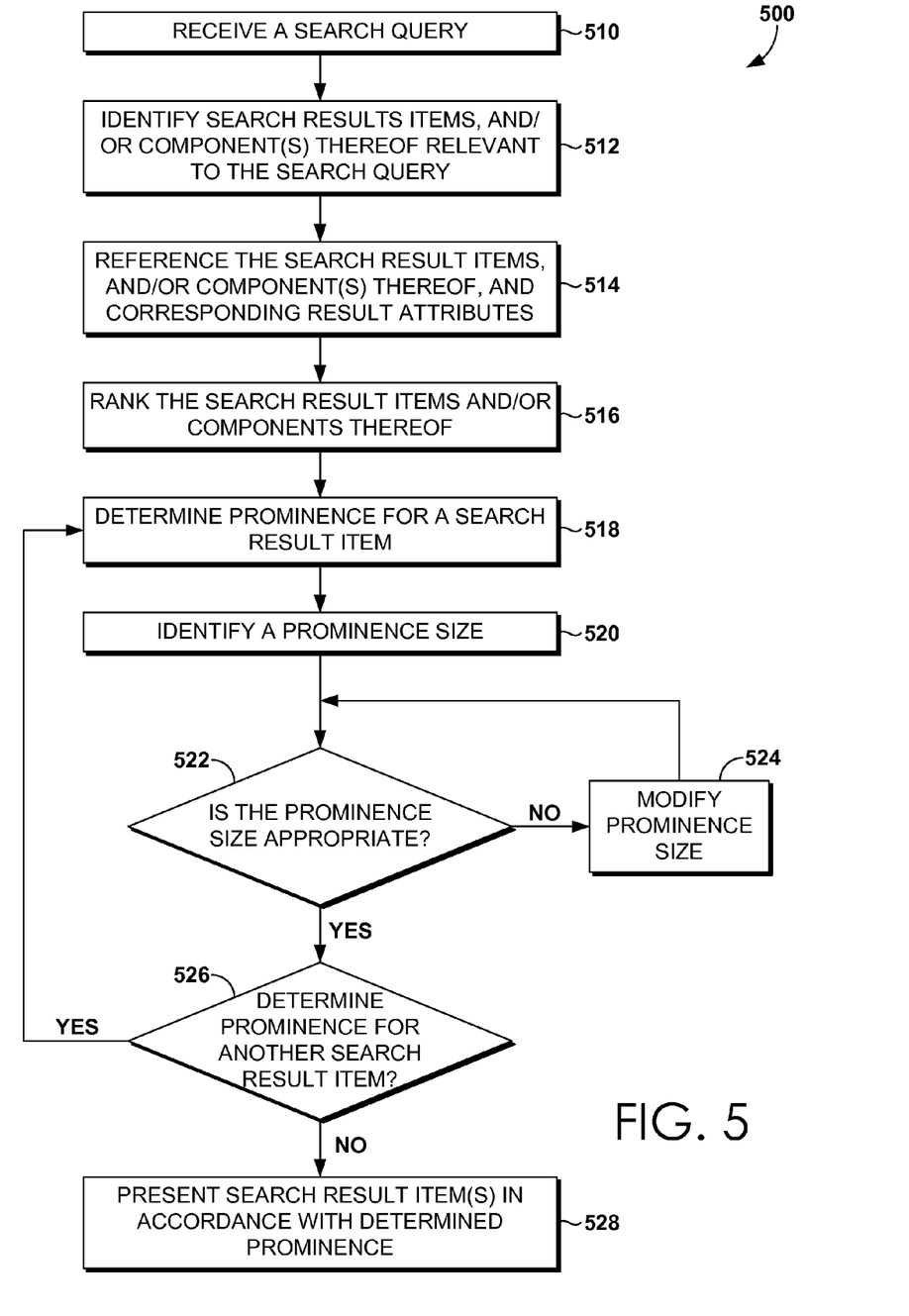
FIG. 5 is a flow diagram depicting a first illustrative method for facilitating presentation of search result items having varying prominence, according to embodiments of the invention.

To recapitulate, embodiments of the invention include systems, machines, media, methods, techniques, processes and options for providing varying prominence (i.e., size allocation) of search result items. Such search result items having varying prominence can be displayed within a search results page. Turning to FIG. 5, a flow diagram is illustrated that shows an exemplary method 500 for providing search result items having varying prominence, according to embodiments of the present invention. In some embodiments, aspects of embodiments of the illustrative method 500 can be stored on computer-readable media as computer-executable instructions, which are executed by a processor in a computing device, thereby causing the computing device to implement aspects of the method 500. The same is of course true with the illustrative methods 600 and 700 depicted in FIGS. 6 and 7, respectively, or any other embodiment, variation, or combination of these methods. Such illustrative methods can be performed, for example, by a user device, a searching service, a size-modifying service, or a combination thereof.

Initially, at block 510, a search query is received. Such a search query might be input by a user using a user device, such as user device 210 of FIG. 2. At block 512, search result items, and/or components thereof, relevant to the search query are identified. In one embodiment, search result items or components might be web results or instant answers (e.g., image instant answer, video instant answer, news instant answer, etc.). Search result items can be identified upon submission of the search query. At block 514, the search result items (or components) and corresponding result attributes are referenced. Such result attributes might be historical data indicating user engagement stored within an accessible database. The search result items (or components) are ranked at block 516. In some cases, search result items (or components) can be ranked utilizing at least a portion of the result attributes. At block 518, a prominence determination is made for a search result item. In this regard, a determination is made as to whether to adjust prominence of the search result item. A prominence determination might be made by comparing result attributes associated with the search result item to result attributes associated with at least one other search result item to be displayed within the search result page. At block 520, a prominence size is identified for the search result item. In some embodiments, a prominence size is selected from among a set of predetermined prominence sizes. Alternatively, a prominence side is calculated or identified using, for example, a scaling factor, proportion, algorithm, etc.

At block 522, it is determined whether the prominence size is appropriate. In this regard, the suggested prominence size is verified such that it complies with any constraints. If it is determined that the prominence size is not appropriate, the prominence size is modified and reevaluated, as indicated at block 524. On the other hand, if the prominence size is appropriate, it is determined whether a prominence determination is necessary or appropriate for another search result item. This is indicated at block 526. If a prominence determination is necessary for another search result item, the method returns to block 518. By contrast, if a prominence determination is not necessary for another search result item, at block 528, the search result item(s) are presented in accordance with the determined prominence size(s). In this regard, the search result items presented on the search results page can be displayed having varied prominence based on historical user engagement of the search result items within the page.

Figure 6:
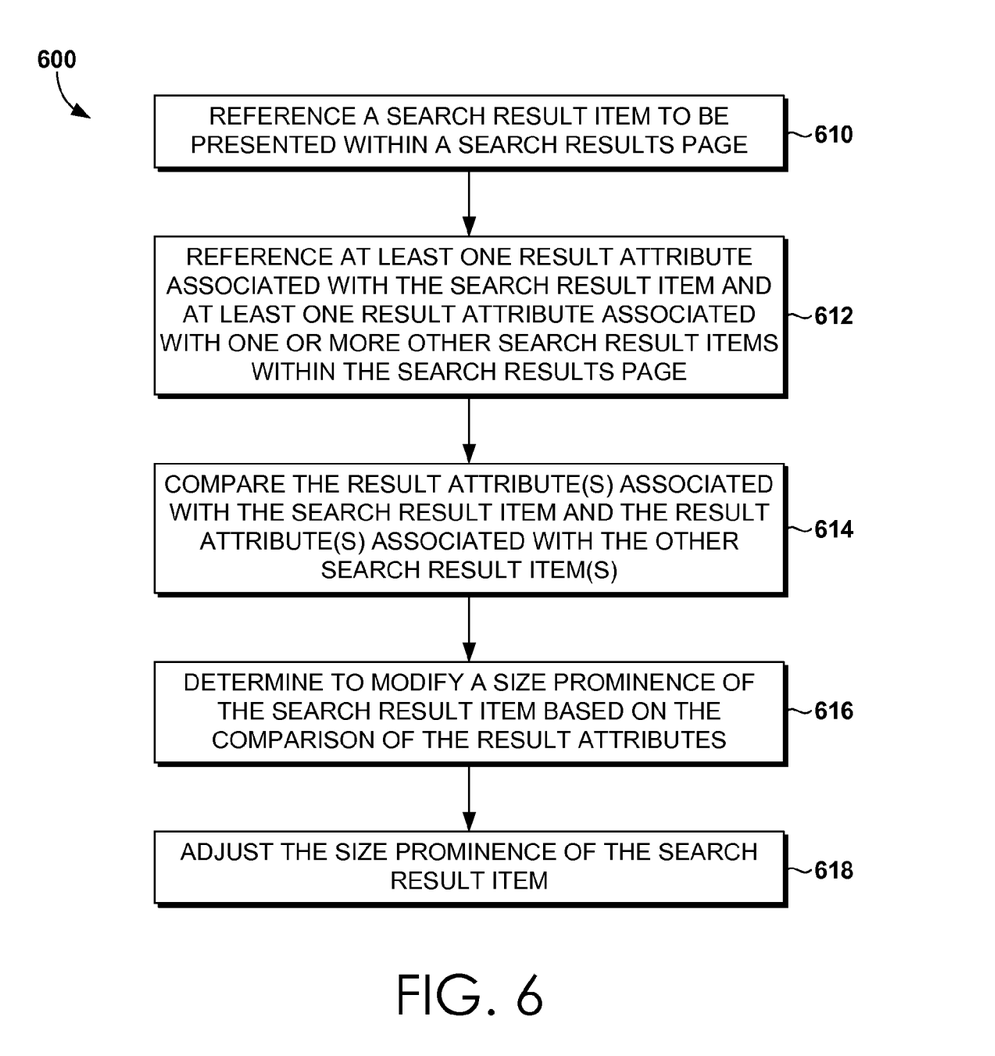
FIG. 6 is a flow diagram depicting a second illustrative method of facilitating presentation of search result items having varying prominence, in accordance with embodiments of the invention.

Turning now to FIG. 6, a flow chart depicts an illustrative method 600 of providing search result items having varying prominence. Initially, at block 610, a search result item to be presented within a search results page is referenced. At least one result attribute associated with the search result item and at least one result attribute associated with one or more other search result items within the search results page are referenced. This is indicated at block 612. As can be appreciated, result attributes can be associated with user engagement in connection with search result items. At block 614, the result attribute(s) associated with the search result item and the result attribute(s) associated with the other search result(s) are compared. Subsequently, at block 616, it is determined that a size prominence of the search result item is to be modified based on the comparison of the result attributes. The size prominence of the search result item is adjusted accordingly, as indicated at block 618.

Figure 7:
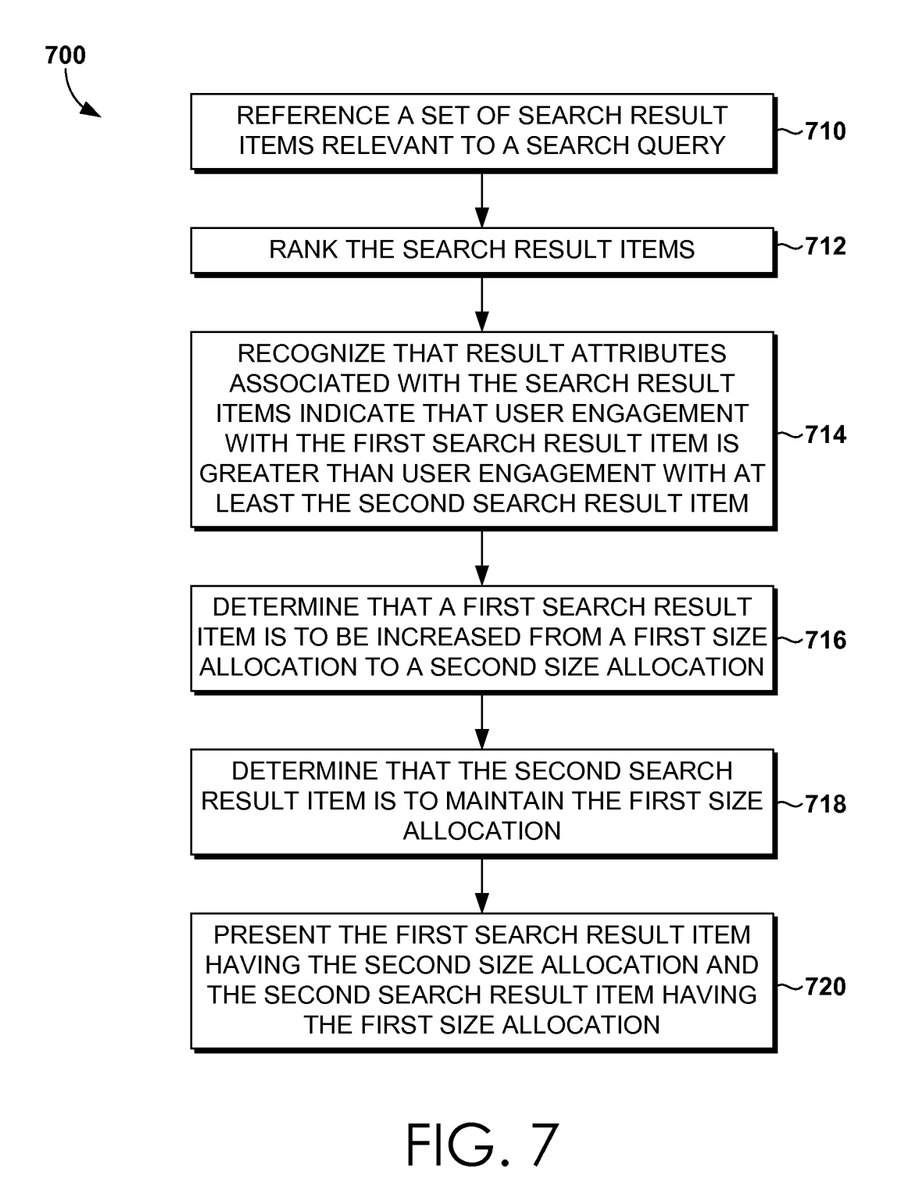
FIG. 7 is a flow diagram depicting a third illustrative method of facilitating presentation of search result items having varying prominence according to embodiments of the invention.

With reference to FIG. 7, another flow chart depicts an illustrative method 700 of providing search result items having varied prominence. With initial reference to block 710, a set of search result items relevant to a search query are referenced. In one embodiment, the set of search result items are the web results and instant answers to be presented within the search content region. The search result items are ranked, as indicated at block 712. At block 714, it is recognized that result attributes associated with the search result items indicate that user engagement with a first search result item is greater than user engagement with at least a second search result item. Based on the user engagement, it is determined that the first search result item is to be increased from a first size allocation to a second size allocation, as indicated at block 716. At block 718, it is determined that the second search result item is to maintain the first size allocation. The first search result item having the second size allocation and the second search result item having the first size allocation are presented. This is indicated at block 720.

Various embodiments of the invention have been described to be illustrative rather than restrictive. Alternative embodiments will become apparent from time to time without departing from the scope of embodiments of the inventions. It will be understood that certain features and sub-combinations are of utility and may be employed without reference to other features and sub-combinations. This is contemplated by and is within the scope of the claims.

The invention claimed is:

1. A computing system comprising:
a processor; and
computer storage memory having computer-executable instructions stored thereon which, when executed by the processor, configure the computing system to facilitate presentation of search result items having varied prominence, the processor being operable, when executing the instructions, to:
reference a search result item to be presented within a search results page in response to a search query;
determine that a size prominence of the search result item is to be modified based on a click-through rate associated with the search result item exceeding a threshold value compared to click-through rates associated with one or more other search result items within the search results page, each of the search result item and the one or more other search result items being a different set of components displayed as a group adjacent to one another on the search results page;
select a modified size prominence to which the size prominence is to be adjusted; and
adjust the size of the search result item to the modified size prominence in accordance with the determination that the size prominence of the search result item is to be modified, the adjusting comprising increasing the vertical space allocation and a number of components of the search result item.

2. The system of claim 1, wherein each of the search result item and the one or more other search result items comprise an instant answer or a web result.

3. The system of claim 1, wherein each of the search result item and the one or more other search result items comprise an advertisement.

4. The system of claim 1, wherein each of the search result item and the one or more other search result items comprise a related search item.

5. The system of claim 1, wherein each of the search result item and the one or more other search result items comprise a tab item.

6. The system of claim 1, wherein the determination to modify the size prominence dynamically occurs, without user intervention, upon submission of a search query.

7. The system of claim 1, wherein the one or more other search result items comprise all of the search result items to be presented on the search result page other than the search result item.

8. The system of claim 1, wherein the size prominence comprises a vertical space, a vertical height, a pixel height, a horizontal width, a horizontal space, a number of lines, a character count, a number of components, or a combination thereof.

9. A method of presenting search result items having varied prominence, the method comprising:
presenting a first display area for displaying a first search result item and a second search result item presented on a search results page, the first search result item and the second search result item comprising an instant answer or a web result, each of the first search result item and the second search result item being a different set of components displayed as a group adjacent to one another on the search results page;
identifying result attributes associated with the first search result item and a second search result item, the result attributes being historical data related to the first search result item and a second search result item, the results attributes being updated as historical data is gathered, the result attributes comprising a click-through rate;
determining that the first search result item has a click-through rate exceeding a first threshold relative to a click-through rate associated with at least the second search result item presented on the search results page;

adjusting the size allocation of the first search result item to a first greater predetermined size vertical space allocation; and increasing a number of components of the first search result item.

10. The method of claim 9, wherein the size allocation comprises a vertical space, a vertical height, a pixel height, a horizontal width, a horizontal space, a number of lines, a character count, a number of components, or a combination thereof.

11. The method of claim 9, wherein the click-through rates are continually updated such that a size modification determination of a search result item may differ between queries.

12. The method of claim 9, further comprising determining that the first search result item has a click-through rate exceeding a second threshold relative to a click-through rate associated with at least the second search result item presented on the search results page and adjusting the size allocation of the first search result item to a second greater predetermined size.

13. A computing system comprising:
a processor; and
computer storage memory having computer-executable instructions stored thereon which, when executed by the processor, configure the computing system to facilitate presentation of search result items having varied prominence, the processor being operable, when executing the instructions, to:
reference a set of search result items for display within a search results page that are relevant to a search query, the set including web results and instant answers;
rank the search result items based on relevance to the search query;
determine that a first search result item is to be increased from a first size allocation to a second size allocation that is greater than the first size allocation based on one or more result attributes associated with the search result items indicating that a click-through rate for the first search result item is greater than a click-through rate for at least the second search result item, each of the first search result item and the second search result item being a different set of components displayed as a group adjacent to one another on the search results page;
increase a number of components of the first search result item;
determine that a second search result item is to be modified to accommodate for the increase of the first search result item to the second size allocation such that the search result items may be displayed in accordance with one or more search result constraints; and
present the first search result item having the second size allocation and the second search result item having the first size allocation within the search results page in accordance with the corresponding ranking.

14. The system of claim 13, wherein a cost function is used to determine that the first search result item is to be increased from the first size allocation to the second size allocation.

15. The system of claim 13, wherein the second size allocation is selected from among a plurality of predetermined size allocations.

16. The system of claim 13, wherein the second size allocation is an increased vertical height, a horizontal width, a character count, a number of components, or a combination thereof, compared to the first size allocation.

17. The system of claim 13, wherein the second search result item is modified by decreasing the size allocation of the second search result item.

18. The system of claim 13, wherein the second search result item is modified by moving the second search result item out of the initial viewing region or to another search results page that is required to be navigated to.

19. The system of claim 13, wherein the one or more search result constraints may include a size constraint, a total size for a particular type of search result items, a number of a particular type of search result items on a page or initial viewing screen, or a number of search result items on a page or initial viewing screen.

20. A hardware device having computer-executable instructions embodied thereon that, when executed, cause a computing device to present search result items having varied prominence, the instructions causing the computing device to:
present a first display area for displaying a first search result item and a second search result item presented on a search results page, the first search result item and the second search result item comprising an instant answer or a web result, each of the first search result item and the second search result item being a different set of components displayed as a group adjacent to one another on the search results page;
identify result attributes associated with the first search result item and a second search result item, the result attributes being historical data related to the first search result item and a second search result item, the results attributes being updated as historical data is gathered, the result attributes comprising a click-through rate;
determine that the first search result item has a click-through rate exceeding a first threshold relative to a click-through rate associated with at least the second search result item presented on the search results page;
adjust the size allocation of the first search result item to a first greater predetermined size based on a determination of a number of search result items to be presented on the search results page, the adjusting comprising increasing the vertical space allocation; and
increase a number of components of the first search result item.

21. The hardware device of claim 20, wherein the search result item is one of an image search result item, news search result item, web search result item, or music search result item.

* * * * *